United States Patent
Chen et al.

(10) Patent No.: US 10,015,218 B2
(45) Date of Patent: Jul. 3, 2018

(54) SYSTEM AND METHOD FOR ADJUSTING TRANSMISSION PARAMETERS OF MULTICAST CONTENT DATA

(71) Applicant: Telefonaktiebolaget L M Ericsson (publ), Stockholm (SE)

(72) Inventors: Xixian Chen, Ottawa (CA); Xiaoming Lai, Ottawa (CA); Weigang Li, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 194 days.

(21) Appl. No.: 14/401,397

(22) PCT Filed: Oct. 20, 2014

(86) PCT No.: PCT/IB2014/065483
§ 371 (c)(1),
(2) Date: Nov. 14, 2014

(87) PCT Pub. No.: WO2016/063106
PCT Pub. Date: Apr. 28, 2016

(65) Prior Publication Data
US 2016/0241615 A1  Aug. 18, 2016

(51) Int. Cl.
H04L 29/06 (2006.01)
H04L 12/24 (2006.01)
H04L 12/18 (2006.01)

(52) U.S. Cl.
CPC ...... *H04L 65/4076* (2013.01); *H04L 12/1863* (2013.01); *H04L 41/5009* (2013.01);
(Continued)

(58) Field of Classification Search
None
See application file for complete search history.

(56) References Cited

U.S. PATENT DOCUMENTS 5,722,051 A  2/1998 Agrawal et al.
7,289,574 B2  10/2007 Parolari
(Continued)

FOREIGN PATENT DOCUMENTS

WO  WO 2005/036917 A1  4/2005
WO  WO 2011/087905     7/2011
WO  WO 2011/134501 A1  11/2011

OTHER PUBLICATIONS

PCT Notification of Transmittal of the International Search Report and the Written Opinion of the International Searching Authority, or the Declaration for International application No. PCT/IB2014/065483, dated Jul. 6, 2015.
(Continued)

*Primary Examiner* — Angela Nguyen
(74) *Attorney, Agent, or Firm* — Sage Patent Group

(57) ABSTRACT

According to certain embodiments, methods and systems for providing broadcast multicast service include transmitting, by a network node, a first transmission of multicast content data to wireless devices at a first quality of service level and a second transmission of multicast content data to the wireless devices at a second quality of service level. The second quality of service level may be of a higher quality of service than the first quality of service. Feedback may be received from at least one wireless device in the broadcast service area. In response to the feedback from the wireless devices, one or more transmission parameters associated with a subsequent transmission of the multicast content data may be adjusted.

19 Claims, 11 Drawing Sheets

(52) U.S. Cl.
CPC ............ *H04L 65/607* (2013.01); *H04L 65/80* (2013.01); *H04L 41/509* (2013.01)

(56) References Cited

U.S. PATENT DOCUMENTS

| | | | |
|---|---|---|---|
| 7,720,136 B2 | 5/2010 | Friedman et al. | |
| 7,958,252 B2 | 6/2011 | Chandhok et al. | |
| 8,364,179 B2 | 1/2013 | Ashkenazi et al. | |
| 8,693,413 B2 | 4/2014 | Kanazawa et al. | |
| 8,750,181 B2 | 6/2014 | Purnadi et al. | |
| 2002/0077841 A1* | 6/2002 | Thompson | A61N 1/37235 705/3 |
| 2003/0061368 A1* | 3/2003 | Chaddha | G06T 9/40 709/231 |
| 2005/0113099 A1 | 5/2005 | Eriksson et al. | |
| 2005/0129058 A1* | 6/2005 | Casaccia | H04L 1/1671 370/464 |
| 2006/0150055 A1 | 7/2006 | Quinard et al. | |
| 2008/0259855 A1* | 10/2008 | Yoon | H04L 1/1657 370/329 |
| 2010/0128650 A1 | 5/2010 | Morimoto et al. | |
| 2010/0128873 A1* | 5/2010 | Karroumi | H04N 7/165 380/255 |
| 2011/0243052 A1 | 10/2011 | Alay et al. | |
| 2012/0099419 A1* | 4/2012 | Kim | H04L 1/1854 370/216 |
| 2013/0215813 A1 | 8/2013 | Kotecha et al. | |
| 2013/0332969 A1* | 12/2013 | Stewart | H04N 21/47202 725/87 |

OTHER PUBLICATIONS

"Adaptive Error Control for Scalable Video Streaming over Wireless Internet" by Jen-Wen Ding et al., 2006.

"Performance Analysis of eMBMS in LTE: Dynamic MBSFN Areas" by Iglesias et al., 2012.

Universal Mobile Telecommunications System (UMTS); Introduction of the Multimedia Broadcast/Multicast Service (MBMS) in the Radio Access Network (RAN); Stage 2 (3GPP TS 25.346 version 10.0.0 Release 10), 2011.

\* cited by examiner

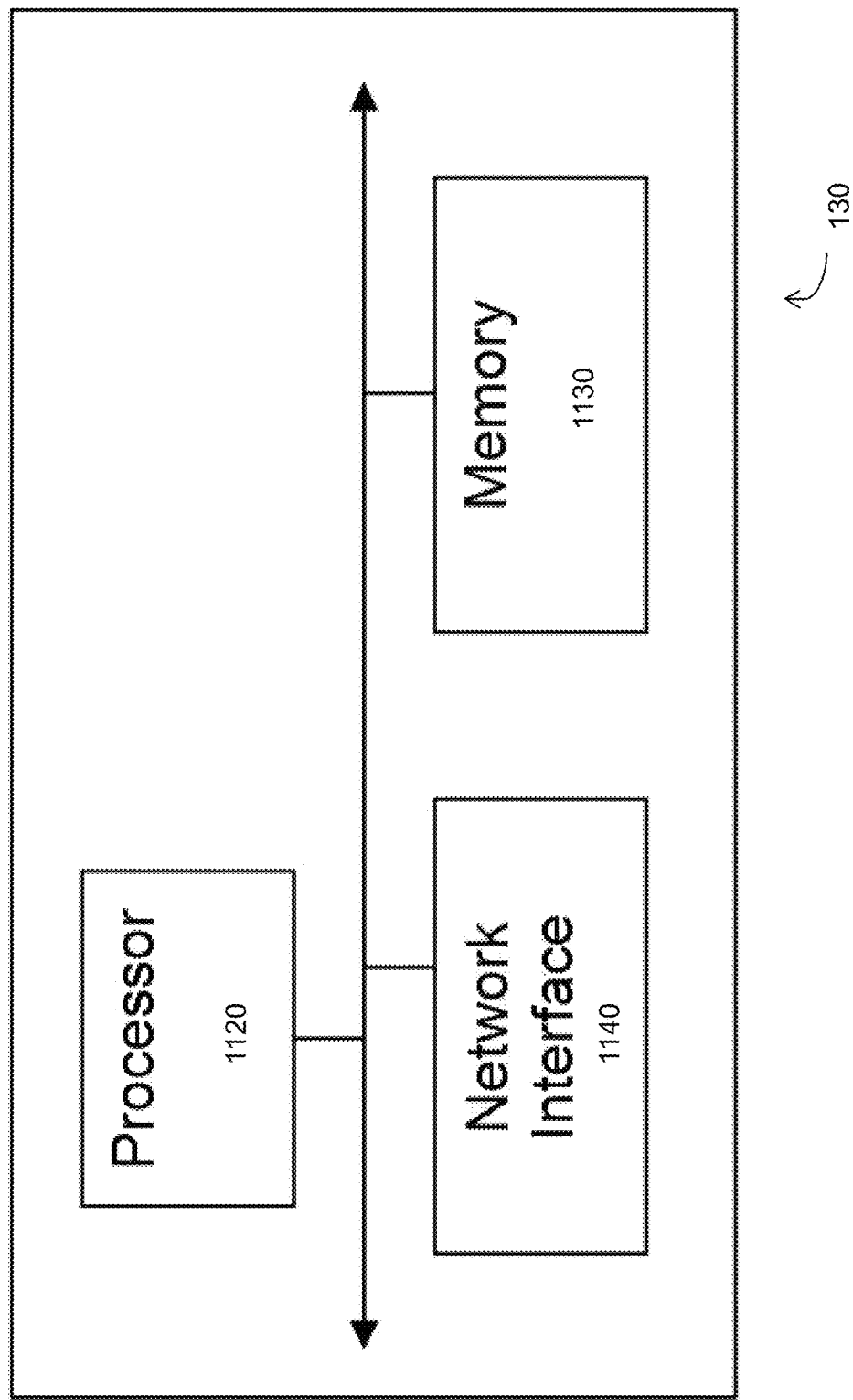

SYSTEM AND METHOD FOR ADJUSTING TRANSMISSION PARAMETERS OF MULTICAST CONTENT DATA

PRIORITY

This nonprovisional application is a U.S. National Stage Filing under 35 U.S.C. § 371 of International Patent Application Serial No. PCT/IB2014/065483, filed Oct. 20, 2014, and entitled "System and Method for Adjusting Transmission Parameters of Multicast Content Data."

TECHNICAL FIELD

Particular embodiments relate generally to wireless communications and more particularly to a system and method for adjusting transmission parameters of multicast content data.

BACKGROUND

The Multimedia Broadcast Multicast Service (MBMS) is a point-to-multipoint service, which is designed to provide efficient delivery of broadcast and multicast services. Specifically, multicast and broadcast content may be transmitted from a single source entity to multiple recipients.

MBMS may be considered a key new feature of the Long Term Evolution (LTE) project, which focuses on enhancing the Universal Terrestrial Radio Access Network (UTRAN). MBMS exploits the LTE radio interface to transmit multicast or broadcast data as a multi-cell transmission over a synchronized Single Frequency Network (SFN). Such an operation may be known as a MBMS over Single Frequency Network (MBSFN) and operates by making the MBSFN transmission appear to the wireless devices receiving the transmission as if the transmission is from a single larger cell.

MBMS may be is split into the MBMS Bearer Service and the MBMS User Service. The MBMS Bearer Service includes a Multicast- and a Broadcast Mode with only the Broadcast mode being available over LTE. MBMS Bearer Service uses IP multicast addresses for the delivery of content. The advantage of the MBMS Bearer Service compared to unicast bearer services includes the sharing of transmission resources in the core and radio networks. For example, MBMS may use an advanced counting scheme to decide, whether or not zero, one or more dedicated (i.e. unicast) radio channels lead to a more efficient system usage than one common (i.e. broadcast) radio channel. The MBMS User Service is basically the MBMS Service Layer and offers a Streaming- and a Download Delivery Method. The Streaming Delivery method can be used for continuous transmissions like Mobile TV services. The Download Method is intended for "Download and Play" services.

Evolved MBMS (eMBMS) is an emerging technology for LTE that allows efficient distribution of live and premium content to subscribers. Specifically, eMBMS is a highly efficient means of broadcasting content to multiple users simultaneously, utilizing LTE networks. This emerging broadcast technology for LTE has the potential to greatly reduce the cost for distribution of popular multimedia content—both for streaming as well as for content delivered during off-peak hours, stored in mobile device memory, and accessed at a time of the user's choosing. eMBMS may be particularly useful during live events, such as music concerts or sports events, where millions of consumers are simultaneously viewing the same content, and where eMBMS could be used to broadcast complementary content, like different camera angles for instance, to users of LTE devices.

By introducing eMBMS, operators can make better use of their available spectrum and free up network capacity. In this way, operators will be able to maximize efficiency when offering services such as live TV, video on demand, podcasts and even software upgrades to a large number of mobile devices and set-top boxes. However, such services are not without their limitations. On such limitation may be reliability where the content is transmitted to many different devices in differing areas and sub-areas of a service area. However, there are ways to improve reliability. One such method that operates efficiently for unicast transmission is the Automatic Repeat re-Quest (ARQ). However, in a multicast transmission scheme, a feedback implosion problem may occur when too many receivers are transmitting back to the sender at one time.

To increase transmission reliability in MBMS and eMBMS contexts, an application layer forward error correction (FEC) code may be used. Using an FEC scheme, the sender of the multicast or broadcast content adds redundant information in the messages transmitted to the receivers. The redundant information allows the receiver to reconstruct the source data. While such schemes may improve reliability, they inevitably add a constant overhead in the transmitted data and are computationally expensive at the receiver. Additionally, it may be very difficult for the operator to decide how much redundant information should be added so that all wireless devices receiving MBMS services receive acceptable quality of service (QoS).

Furthermore, eMBMS uses fixed content bit rates and coding rates that are tuned for the wireless devices experiencing the worst channel conditions. To ensure that these wireless devices receive adequate services, the network may over-provision resources for certain sub areas. Additionally, the conventional eMBMS does not provide QOS differentiated services.

SUMMARY

According to some embodiments, systems and methods are provided for providing Multimedia Broadcast Multicast Service (MBMS) content using transmission schemes that are adjusted based on feedback received from the recipient wireless devices.

For example, in particular example implementations, methods and systems for providing broadcast multicast service may include transmitting, by a network node, a first transmission of multicast content data to wireless devices at a first quality of service level and a second transmission of multicast content data to the wireless devices at a second quality of service level. The second quality of service level may be of a higher quality of service than the first quality of service. Feedback may be received from at least one wireless device in the broadcast service area. In response to the feedback from the wireless devices, one or more transmission parameters associated with a subsequent transmission of the multicast content data may be adjusted.

In another example embodiment, a method for receiving broadcast multicast service by a wireless device may include receiving a first transmission of multicast content data from a network node at a first quality of service level and receiving a second transmission of the multicast content data from the network node at a second quality of service level. The second quality of service level may be of a higher quality of service than the first quality of service. Feedback may be transmitted from the wireless device. The feedback may indicate whether the wireless device was able to decode at least one of the first transmission and the second transmission. The wireless device may then receive a subsequent transmission of multicast content data from the network node. The subsequent transmission of the multicast content data may be transmitted and received with one or more adjusted transmission parameters that are different from the first transmission and the second transmission.

In another example embodiment, a network node for providing broadcast multicast service may include memory containing executable instructions and one or more processors. The processors may cause the network node to transmit a first transmission of multicast content data to wireless devices at a first quality of service level and a second transmission of the multicast content data to wireless devices at a second quality of service level. The second quality of service level may be of a higher quality of service than the first quality of service. Network node may receive feedback from at least one of the wireless devices in the broadcast service area. In response to the feedback from the at least one wireless device, one or more transmission parameters may be adjusted for a subsequent transmission of multicast content data.

In still another example embodiment, a wireless device for receiving broadcast multicast service may include memory containing executable instructions and one or more processors. The processors may operate to cause the wireless device to receive a first transmission of multicast content data from a network node at a first quality of service level and a second transmission of the multicast content data from the network node at a second quality of service level. The second quality of service level may be of a higher quality of service than the first quality of service. Feedback indicating whether the wireless device was able to decode at least one of the first transmission and the second transmission may then be transmitted. A subsequent transmission of multicast content data may then be received from the network node. The subsequent transmission of multicast content data may be transmitted with one or more adjusted transmission parameters that are different from the first transmission and the second transmission.

Some embodiments of the disclosure may provide one or more technical advantages. For example, in certain embodiments, a number of new approaches for adaptation of content bit rate and coding rate may be provided to improve MBMS service reliability and efficiency. Another advantage may be that differentiated quality of service (QoS) levels may be provided to users of wireless devices receiving MBMS services. Providing differentiated services may benefit content providers by providing increased revenues for premium users who are willing to pay more money to receive better service quality.

Still another advantage may be that source and forward error correction (FEC) coding schemes and modulation and coding scheme (MCS) that are applied initially may be adjusted for subsequent transmission on an application level. For example, transmission schemes that initially use minimum MCS may be adjusted to a higher MCS based on feedback received from wireless devices in the service area. Additionally or alternatively, the source coding and FEC coding rates may be adjusted to meet desired quality of service levels.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 11 is a block diagram illustrating certain embodiments of a core network node, according to certain embodiments.

DETAILED DESCRIPTION

Multimedia Broadcast Multicast Service (MBMS) and evolved MBMS (eMBMS) are point-to-multipoint services, which are designed to provide efficient delivery of broadcast and multicast services. For the transmission of MBMS content, source and FEC coding may be done at the application level when a MBMS packet is formed. The packet may then be transmitted to each cell of the radio network nodes providing MBMS services. At the transport channel level, the appropriate modulation and coding scheme (MCS) may be applied by each cell during transmission. Thereafter, each wireless device may perform joint decoding between application level source, FEC, and physical layer MCS and send feedback to the network node from which the MBMS packet was received. As will be described in more detail below, the feedback may be automatically generated or user generated and may indicate a level of quality with which the packet was received by the wireless device. The source and FEC coding schemes, MCS, and the number of scheduler blocks may then be adjusted based on the feedback from the wireless devices in the MBMS service areas. Retransmissions of the MBMS content may improve the quality of service (QoS) received by the wireless devices.

Figure 1:
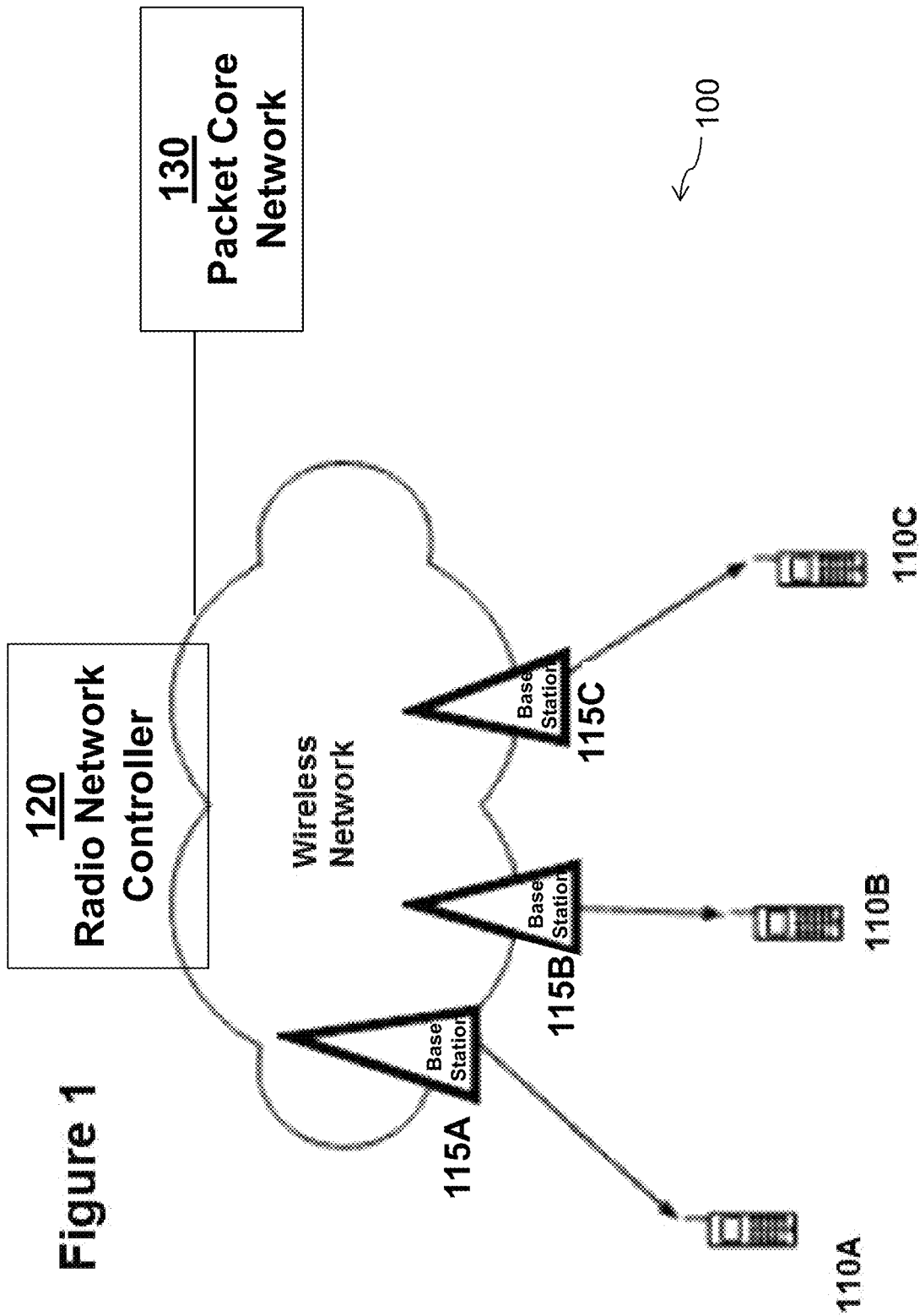
FIG. 1 is a block diagram illustrating embodiments of a radio network for providing Multimedia Broadcast Multicast Service (MBMS) data content with one or more adjusted transmission parameters, according to certain embodiments.

FIG. 1 is a block diagram illustrating embodiments of a radio network 100 for providing MBMS data content with one or more adjusted transmission parameters that includes one or more wireless devices 110, radio network nodes 115, radio network controller 120, and core network nodes 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionalities for wireless device 110. Wireless device 110 may exchange certain signals with core network node 130 using the non-access stratum layer. In non-access stratum signaling, signals between wireless device 110 and core network node 130 may be transparently passed through the radio access network.

As described above, example embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of radio network node 115, wireless device 110, and network nodes (such as radio network controller 120 or core network node 130) are described with respect to FIGS. 7, 8, and 9 below, respectively.

The terms wireless device 110 and network node 115, as used herein, are considered general terms and are intended to be considered as non-limiting. For example, "network node" may correspond to any type of radio network node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as 3GPP Long Term Evolution (LTE) technology, which is a mobile broadband wireless communication technology in which transmissions from radio network nodes 115, which may include base stations such as those referred to as eNBs in particular embodiments, to wireless devices, which may also be referred to as user equipment (UE), are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot). A unit of one subcarrier and 1 OFDM symbol is referred to as a resource element (RE). However, it is generally recognized that the disclosure is not limited to 3GPP LTE or other provided examples and other embodiments could use different radio access technologies.

Figure 2:
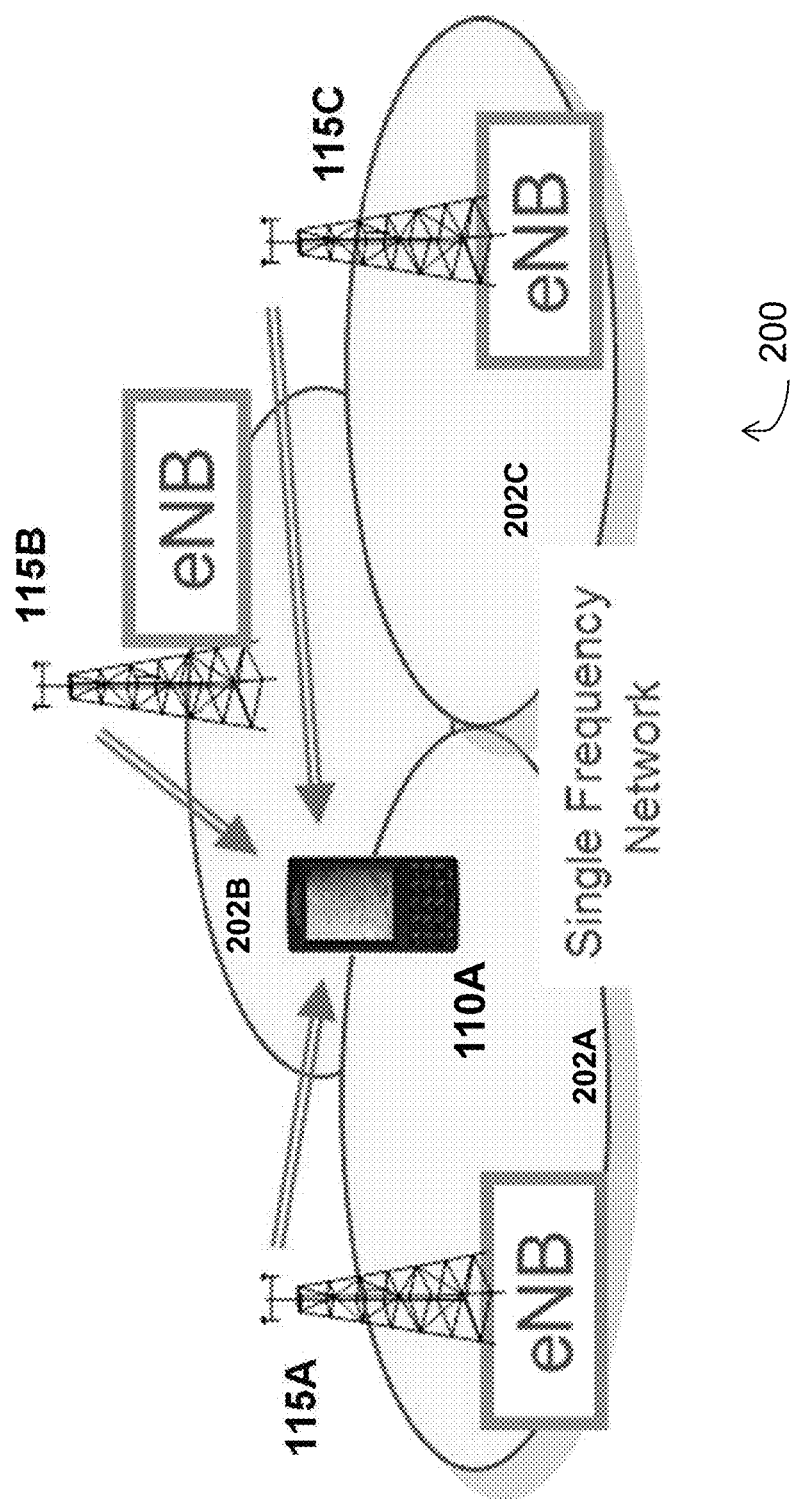
FIG. 2 is a schematic diagram of an example single frequency network 200 for providing MBMS data content, according to certain embodiments.

For providing MBMS services, the network may include a single frequency network in which data is transmitted to a recipient from several transmitters simultaneously. FIG. 2 is a schematic diagram of an example single frequency network 200 for providing MBMS services, according to certain embodiments. As depicted network 200 includes three network nodes 115A, 115B, and 115C that may be similar to those described above with regard to network nodes 115 of FIG. 1. Network nodes 115A, 115B, and 115C are each depicted as transmitting MBMS packets to wireless device 110A. Because network 200 is a single frequency network, each network node 115A-C transmits the packets over a common frequency channel. The objective of a single frequency network is efficient utilization of the radio spectrum, allowing a more diverse amount of content to be transmitted in comparison to multi-frequency networks. Single frequency network 200 may also increase the coverage area and decrease the outage probability in comparison to a multi frequency network, since the total received signal strength by wireless device 110A may be increased.

In certain embodiments, wireless device 110A receives transmission of the same signal from each of network nodes 115A-C. At the beginning of an MBMS session, an MBMS point-to-multipoint (MBMS PTM) radio bearer configuration may be performed. Such configuration may imply the establishment of an MBMS PTM Radio Bearer (MRB). On an LTE air interface, eMBMS may include the introduction of new logical channels MCCH (MBMS control channel) and MTCH (MBMS traffic channel), a new transport channel MCH (MBMS channel), and/or a physical channel PMCH (Physical MBMS channel).

Figure 3:
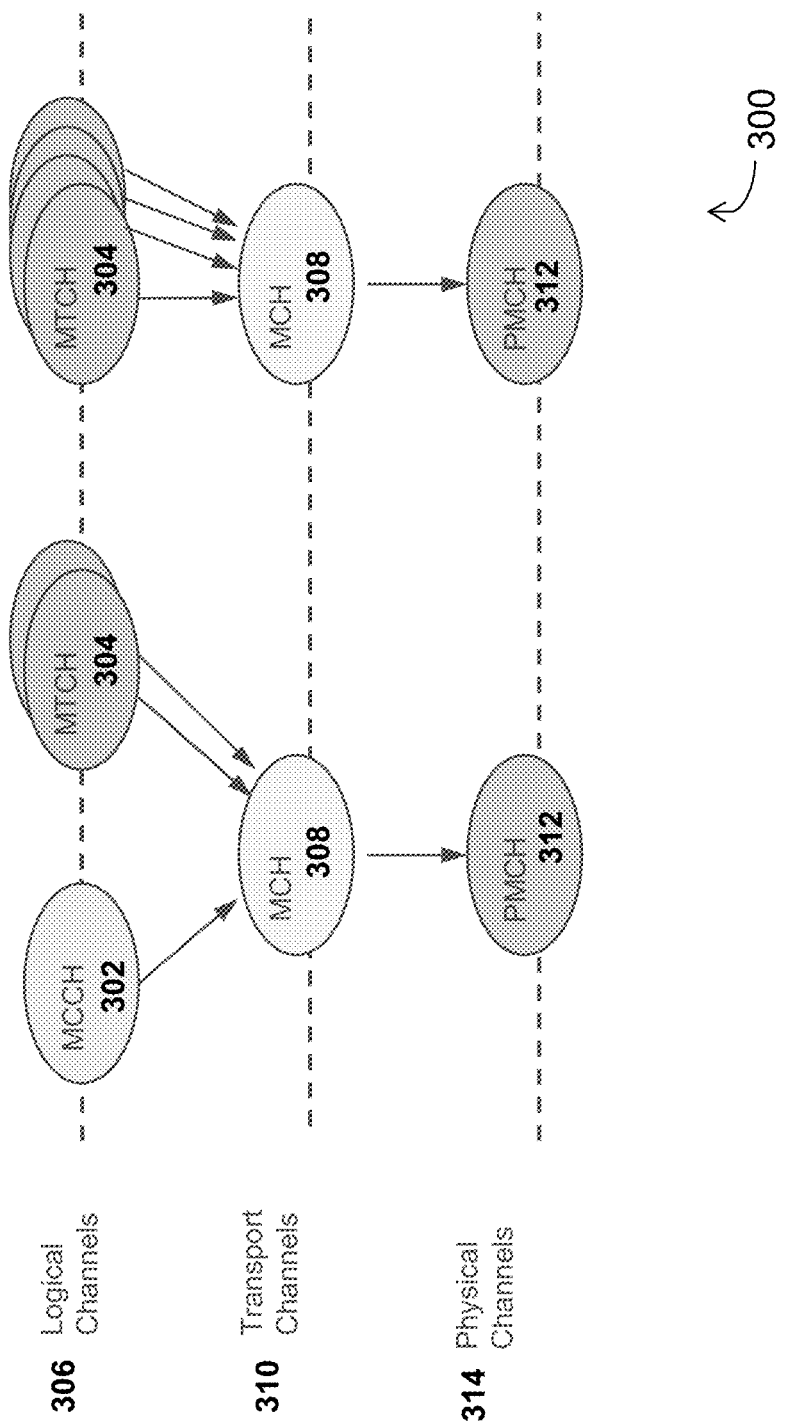
FIG. 3 is a schematic diagram of an example mappings between the different layers, according to certain embodiments.

FIG. 3 is a schematic diagram of an example mappings between the different layers, according to certain embodiments. As depicted, MCCH 302 and MTCH 304 are transported over logical channels 306. MCCH 302 may be used for point-to-multipoint downlink transmission of MBMS control plane information. The physical downlink control channel (PDCCH) may be used for notifying wireless device 110A of upcoming change in information on MCCH due to MBMS session start. In a particular embodiment, there may be a single MCCH 302 for each MBSFN area. MTCH 304 may be used for point-to-multipoint downlink transmission of MBMS user plane information. Additionally, a single MTCH 304 may be established for each MBMS service.

Further, MCH 308 may be used as transport channel 310 for MTCH 304 and MCCH 304. PMCH 312 may be used as physical channel 314 for the MCH 308. In a particular embodiment, there may be a one-to-one mapping between MCH 308 and PMCH 312.

In certain embodiments, MCCH 302 may be transmitted based on a fixed schedule over each cell and may include some or all of the following information:

Synchronization information for the application data packets.

Source and FEC coding schemes and the number of transport blocks (TBs) in each application data packet.

MCS, the TB size, and the start and the number of SBs used for each TB. To save the physical resources for MCCH 302, the start point of SBs could also be configured during MBMS service set-up.

Service ID may also be broadcast periodically to the wireless devices 110 if required.

In operation, each wireless device 110 will decode the MCCH 302 first. The wireless device 110 then uses the information to decode MTCH 304.

As described above, MBMS includes both a streaming delivery method and a download delivery method. Streaming delivery service may be particularly useful during live events, such as music concerts or sports events, where millions of consumers are simultaneously viewing the same content, and where eMBMS may be used to broadcast complementary content, such as different camera angles for instance, to users of LTE devices.

In certain embodiments, different coding schemes may be used to deliver different levels of QoS for the streamed content. Specifically, the content to be broadcast may be first encoded with appropriate source and FEC coding schemes or rates. Returning to FIG. 2, the content of differing coding schemes may then be broadcast to each cell 202A-C in the service area. After segmentation, an appropriate MCS may be used for TB coding.

Wireless device 110A, which receives the content, may then attempt to decode the application data packet received from multiple network nodes 115A-115C based on the information received from the MCCH 302. In certain embodiments, the content may be encoded using different level of FEC coding blocks at different level of QoS. For example, a video clip may be encoded at multiple, differing resolution levels. When encoding the same content at differing levels of QoS, the coding scheme may allow wireless device 110A to improve QoS if wireless device 110A is able to simultaneously receive the same content encoded at the differing levels of QoS. For example, in a particular embodiment, a picture may be encoded with two levels of resolution, a×b and c×d. If wireless device 110A receives both versions of the picture at the differing resolutions, the subsequently decoded picture may have a resolution of m×n, where m>=max(a, c) and n>=max(b, d).

In certain embodiments, the differing levels of source and FEC coding may be coupled to different MCS in radio link. For example, a low quality video with more robust FEC coding may be transmitted using lower MCS. Such a transmission allows more wireless devices 110, especially wireless devices 110 in poor channel conditions, to receive the service at a desirable level of service. As another example, a high quality video with less robust FEC coding may be transmitted using higher MCS. Such a transmission may allow wireless devices 110A-C in good channel conditions or wireless devices 110A-C associated with users who pay more for a higher level of service to receive better service.

Figure 4:
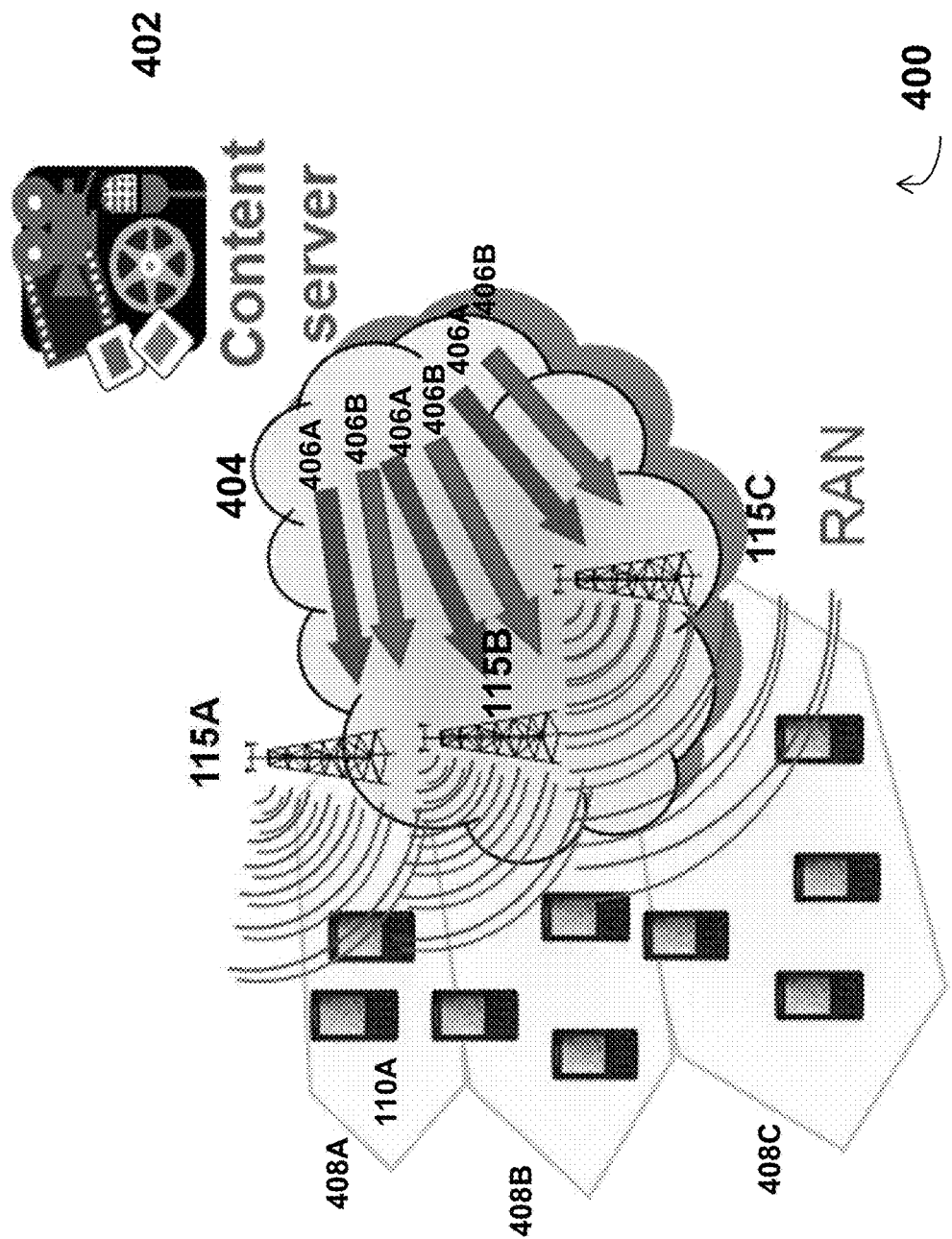
FIG. 4 is a schematic diagram illustrating an example MBMS content delivery system that provides high resolution content and low resolution content, according to certain embodiments.

FIG. 4 is a schematic diagram illustrating an example MBMS content delivery system 400 that provides high resolution content 406A and low resolution content 406B. As described above, the high resolution content 406A and low resolution content 406B may be two versions of the same content transmitted at multiple levels of coding. Specifically, and as depicted in FIG. 4, content from content server 402 is transmitted via network 404 and network nodes 115A-C to wireless devices 110 using two levels of FEC coding schemes for the same content.

In a particular embodiment, content having coding scheme 406A is transmitted at a higher resolution (more pixels). The high resolution content 406A is encoded using a less robust FEC coding scheme and transmitted using higher MCS. In contrast, content 406B is a lower resolution version of the content. The lower resolution content 406B is encoded using a more robust FEC coding scheme and transmitted using lower MCS. Where wireless device 110A receives both high resolution content 406A and low resolution content 406B, wireless device 110A may decode both of versions of the content. As a result, a user of wireless device 110A may see the picture of higher quality. However, if wireless device 110A is able to decode only the low resolution content 406B, the user of wireless device 110A may see the picture of lower quality. In still another example, if wireless device 110A is able to decode the higher quality content 406A in certain instances, the user of wireless device 110A may sometimes see the high quality picture and other times see the low quality picture.

In certain embodiments, feedback may be received from wireless device 110A. The feedback may vary depending upon the type of feedback that wireless device 110A is enabled to provide. Specifically, in certain embodiments, each wireless device 110A may report to its respective network node 115A when the wireless device 110A begins receiving the MBMS service. Likewise, if the wireless device 110A desires to terminate the MBMS service, the wireless device 110A may also transmit a report to network node 115A. In a particular embodiment, a conventional physical random access channel (PRACH) process may be used for transmitting the reports from wireless devices 110A to the respective network nodes 115B.

In certain embodiments, the type of feedback that a wireless device 110A is able to send may depend on the QoS level associated with the wireless device 110A or a subscription service provided to a user of the wireless device 110A For example, in a particular embodiment, wireless device 110A may be associated with a QoS level that enables it to provide one of the following types of feedback:

Type 1: Automatic feedback: Wireless device 110A may calculate the decoding error rate for low quality data packet 406B. If the decoding error rate for low quality data packet 406B exceeds a target rate, wireless device 110A may autonomously send feedback (i.e., a NAK)

to network node 115B using the process similar to a PRACH process or through a newly defined PRACH signaling process.

Type 2: User initiated feedback: Wireless device 110A may calculate the decoding error rates for both low quality data packet 406B and high quality data packets 406A. When the error rate of low quality data packets 406B is below the target error rate but the error rate of high quality data packets 406A is above the target error rate, a user of wireless device 110A may initiate a feedback if the user is not satisfied with the service quality.

Type 3: User initiated feedback: Wireless device 110A may calculate the decoding error rate for only the high quality data packet 406A. When the error rate of high quality data packet 406A is below the target error rate, a user of wireless device 110A may initiate transmission of feedback if the user is not satisfied with the received service quality.

In certain embodiments and to prevent congestion on the feedback channel, network node 115A may adaptively inform wireless device 110A and other wireless devices as to an appropriate time interval in which the wireless devices may send feedback. Such measures may be more necessary in sub-areas where wireless devices 110 are highly concentrated.

In certain embodiments, both the type of content that a user of wireless devices 110 may receive and the type of feedback that such users and wireless devices 110 may provide may depend on the QoS associated with the user. Thus, certain embodiments, may provide QoS differentiated services. For example, content server 402 may provide four different levels of service in one particular embodiment. A "basic user" that pays a lowest amount for service might only receive low quality data content 406B. A "basic user" may also only be able to send Type 1 Feedback. However, a "silver user" that pays a little more than a basic user may receive both high quality content 406A and low quality content 406B. Such a "silver user" may still only be able to send Type 1 Feedback, however. In contrast, a "gold user" may receive both types of content and be able to send both Type 1 and Type 2 Feedback. However, a "VIP user" that pays the highest amount for MBMS service may receive both types of content and send all three types of Feedback.

In certain other embodiments, subsequent transmissions of data content can be adjusted based on the feedback received from wireless devices 110. Specifically, the content bit rate, FEC coding rate, and/or MCS may be adjusted based on the type of feedbacks received and available resources for an eMBMS service. For example, if very few feedbacks of Type 1 are received, network node 115A-C may increase the Content Bit Rate, FEC coding rate, and/or MCS for low quality packets 406B. On the other hand, if a large number of feedbacks of Type 1 are received, the Content Bit Rate, FEC coding rate, and/or MCS for low quality packets may be decreased.

As another example, if very few feedbacks of Type 2 are received, network node 115A-C may increase Content Bit Rate, FEC coding rate, and/or MCS for high quality packets. However, if a large number of feedbacks of Type 2 are received, the Content Bit Rate, FEC coding rate, and/or MCS for high quality packets may be decreased. In another example, if a large number of feedbacks of Type 3 are received, network node 115A-C may increase content bit rate and adjust FEC coding rate and/or MCS where resources are available.

In certain other embodiments, subsequent transmission of content may be adjusted for certain areas that are identified to be not received good quality of service. For example, if a large number of feedbacks of Type 1 are received from one of sub-areas 408A-C, network node 115A-C may transmit the redundant versions of the TBs for low quality packets 406B in the sub-area 408A-C if the resource is available. The redundant versions may help wireless devices in the sub-area 408A-C to reduce their decoding errors for low quality packets 406B. Likewise, if a large number of feedbacks of Type 2 are received from a sub-area 408A-C, network node 115A-C may transmit the redundant versions of the TBs for high quality packet 406A in the sub-area 408A-C if resources for doing so are available. The redundant versions may help wireless devices 110 in this sub-area 408A-C to reduce decoding errors for high quality packets.

Figure 5:
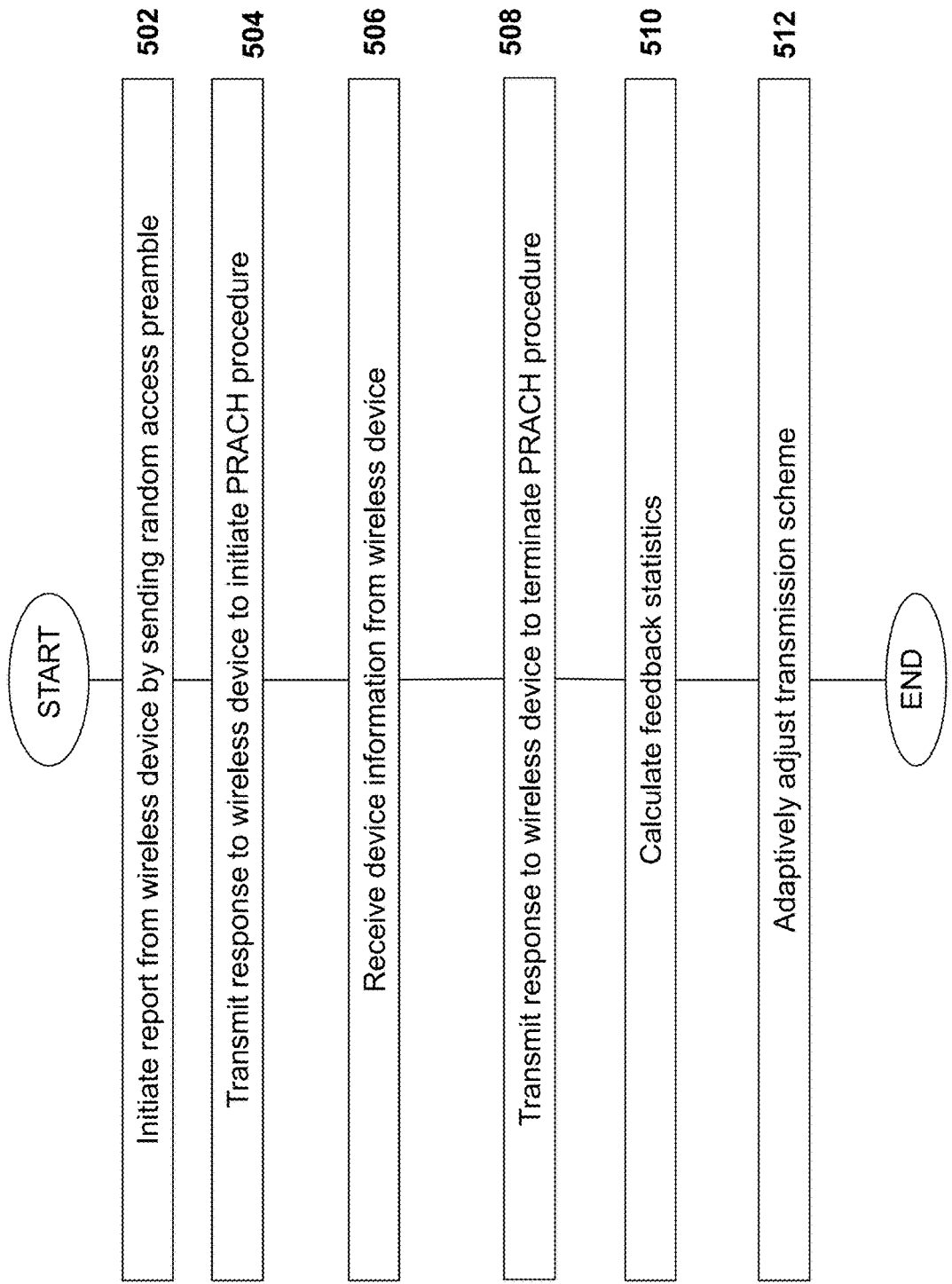
FIG. 5 depicts a method for adjusting a transmission scheme for providing MBMS data content, according to certain embodiments.

FIG. 5 depicts a method for adjusting a transmission scheme for providing MBMS data content, according to certain embodiments. The method may begin at step 502 when one or more wireless devices 110 begin receiving the MBMS service and initiate reporting to network nodes 115. As described above, such a report will also be sent from wireless device 110 to network node 115 when wireless device terminates the MBMS service.

In a particular embodiment, a conventional PRACH process may be used to transmit the reports from wireless devices 110. For example, a wireless device 110 initiates the report by sending random access preamble on a special set of uplink physical layer resources, which are a group of subcarriers allocated for this purpose. The conventional PRACH process may use Zadoff-Chu sequence, a CDMA-like coding, to allow simultaneous transmissions to be decoded 6-bit random ID.

At step 504, network node 115 may transmit a response to wireless device 110. For example, after detecting the random access preamble from a wireless device 110, a radio network node 115 may send the random access response on Physical Downlink Control Channel (PDCCH) within a time window of a few transmission time intervals (TTIs). It conveys at least RA-preamble identifier, timing alignment information, initial UL grant, and assignment of temporary C-RNTI (Cell Radio-Network Temporary Identifier).

At step 506, the network node receives transmission information from the wireless device 110. For example, wireless device 110 can send a device ID, service ID, and/or 1 bit information over the granted PUSCH (Physical Uplink Shared Channel). In one particular embodiments, the one-bit information may be a "0" indicating the initiation of MBMS service. In another example, the one-bit information may be "1" indicating the termination of MBMS service. The user may trigger service initiation or termination of MBMS in certain embodiments.

At step 508, after successfully decoding the message from wireless device 110, network node 115 may send an acknowledgement to wireless device 110 to end the PRACH procedure. In certain embodiments, network node 116 may forward the report to the content server 402 for further processing, such as coding rate adaptation, billing, etc. In a particular embodiment, to avoid the congestion, a random number may be used to decide when such a report should be generated within a relative long time period.

In certain embodiments, a new PRACH signaling process may be used in order to reduce the signaling traffic between wireless devices 110 and network nodes 115 when a large number of wireless devices 110 are providing feedback. Specifically, in a particular embodiment, network node 115 or another network system component 120, 130 or content server 402 may calculate the total number of wireless devices 110 receiving the eMBMS service in the eMBMS service area. The number of wireless devices 110 may be calculated based on the above information reported from wireless devices 110 in the service areas. For the new PRACH signaling process, each wireless device 110 may be assigned a service temporary ID (4-8 bits) plus two information bits. For example, in a particular embodiment, "00" may indicate Type 1 feedback from a wireless device 110, "01" may indicate Type 2 feedback from a wireless device 110, and "11" may indicate Type 3 feedback from a wireless device 110.

When network node 115 decodes this special PRACH signaling successfully, network node 115 may forward the feedback to content server 402 or another service processing center with its cell and network node identifier as well as a time stamp. At step 510, feedback statistics may be determined. For example, based on the reports from all network nodes 115 within the specified time period, content server 402 or another service processing center may determine the following information:

P_UE(i,k)=(the number of wireless devices sending Type i, i=1, 2, 3, feedbacks)/(the total number of wireless devices 110 capable of sending Type i feedbacks)*100, which is the percentage of wireless devices 110 sending Type i feedbacks on an eMBMS service sub-area k, P_UE_SUM(i)=Sum(P_UE_(i,k), k=1, 2, . . . , i=1, 2, 3

In certain embodiments, this special PRACH signaling may be sent through message 3 (Scheduled transmission on UL-SCH) if the conventional PRACH process is used. Alternatively, the wireless device 110 may piggy back this special signaling through PUSCH if wireless device 110 is in RRC connected mode.

At step 512, the transmission scheme may be adjusted based on the feedback statistics determined above. Specifically, in certain embodiments, content server 402 may adaptively adjust the content bit rate, FEC coding rate, and/or MCS as described above. As a result, though conservative coding rates and/or system-wide coding rates may be used for an initial transmission of content, the coding rates may be adjusted and particularized for one or more areas or sub-areas if the feedback indicates that adjustment will improve service quality. Additionally or alternatively, if the channel conditions are very good for most of wireless devices 110 in the service area, the Multiple Input and Multiple Output (MIMO) technology may be used to increase the overall system throughput.

Figure 6:
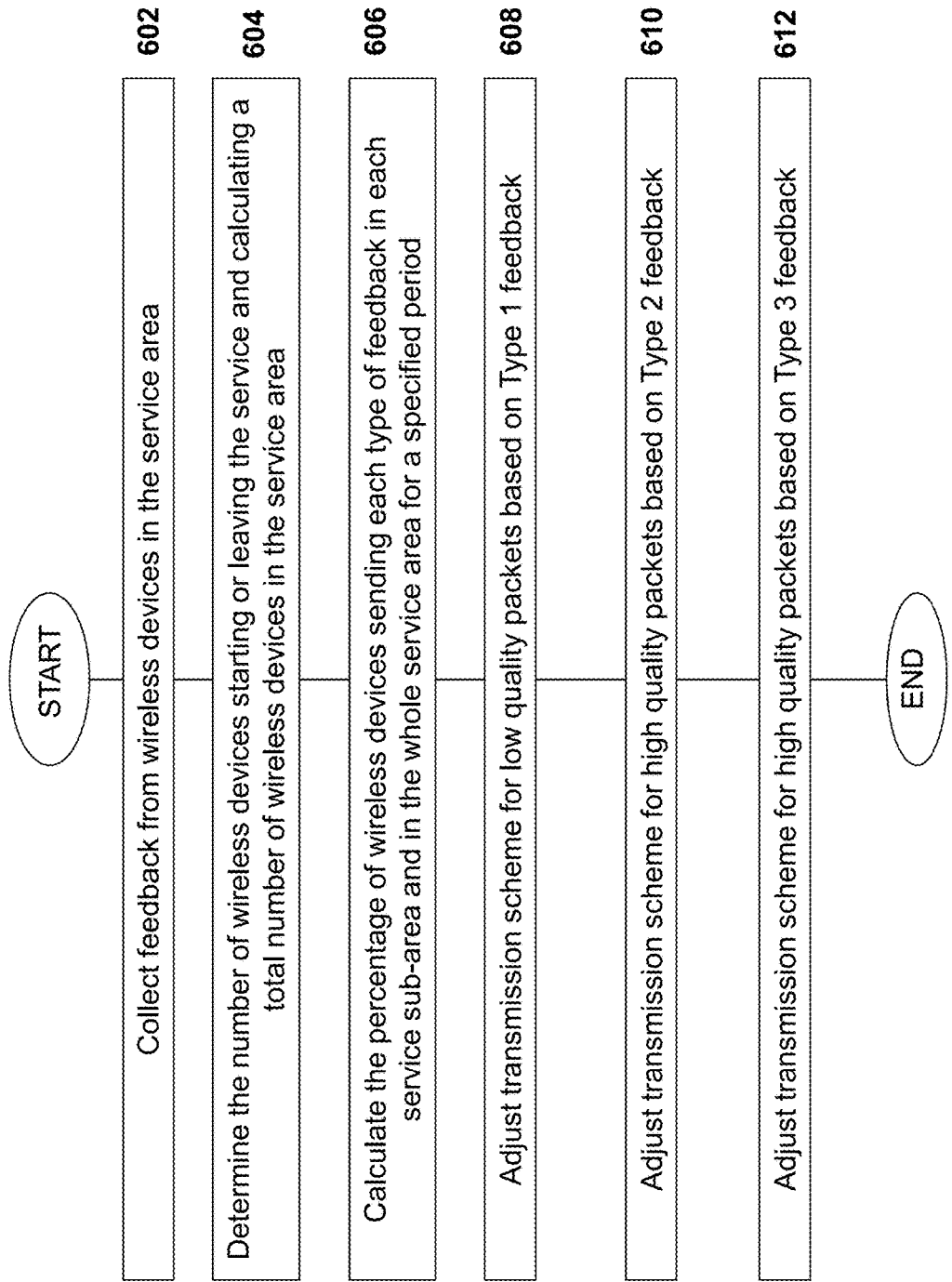
FIG. 6 depicts another method for adjusting a transmission scheme for providing MBMS data content, according to certain embodiments.

FIG. 6 depicts another method for adjusting a transmission scheme for providing MBMS data content, according to certain embodiments. The method may begin at step 602 with the collection of feedback from wireless devices 110. The feedback may be collected by network nodes 115 and forwarded to a content server 402, in certain embodiments. Content server 402 may collect all feedbacks from wireless devices in the service areas 408A-C. As described above, the feedback may include messages identifying that wireless devices 110 are initiating or terminating MBMS.

At step 604, a total number of the wireless devices that are receiving MBMS in the service area may be calculated. For example, if a wireless device is beginning to receive the service, the total number will be increased by 1. If a user is leaving the service, the total number will be decreased by 1.

At step 606, the percentage of wireless devices 110 sending each type of feedbacks may be calculated. In certain embodiments, the percentage may be calculated for the entire service area. Additionally or alternatively, the percentage may be calculated each service sub-area 408A-C. The percentages may be calculated for a specified period based on the feedback received from wireless devices 110. For example, in a particular embodiment, Type 1, Type 2, and Type 3 feedbacks on each eMBMS service sub-area 408A-C and on the whole service area may be calculated as P_UE(i,k), P_UE_SUM(i), i=1, 2, 3; k=1, 2, . . . , M, as described above.

At step 608, the transmission scheme may be adjusted for low quality content 406B for Type 1 feedback. In certain embodiments, the Content Bit Rate, FEC coding rate, and/or MCS may be adjusted for low quality content 406B based on the Type 1 feedback received from wireless devices 110. In a particular embodiment, for example, content server 402 and network nodes 115 may begin transmitting redundant versions of the low quality content 406B for each sub-area when P_UE(1,k)>P_High. By contrast, content server 402 and network nodes 116 may stop sending the redundant versions for low quality content 406B for a sub-area k (such as 406A) when P_UE(1,k)<P_Low. The following is one example pseudo code for performing the described operations:

```
For each sub area k
    If (P_UE(1,k) < P_Low)
        Stop sending the redundant versions for low quality packet for
    sub-area k
    Else if (P_UE(1,k) > P_High)
        Stop sending the redundant versions for high quality packet
    for sub-area k
        Start sending the redundant versions for low quality packet
        for sub-area k if having available resources
    End if
End Loop k
If {(P_UE SUM(1) < P_Low) and (no redundant versions sent from
any sub-area)}
    Increase both Content Bit and FEC coding rates for low quality
    packets
Else if (P_UE_SUM(1) > P_High)
    Decrease both Content Bit and FEC coding rates for low quality
packets
End If
```

At step 610, the transmission scheme may be adjusted for high quality content 406A based on Type 2 feedback. In certain embodiments, the Content Bit Rate, FEC coding rate, and/or MCS may be adjusted for high quality content 406A based on the Type 2 feedback received from wireless devices 110. In a particular embodiment, for example, content server 402 and network nodes 115 may begin transmitting redundant versions for high quality content 406A for a sub-area k 408A-C when P_EU(2,k)>P_High. As another example, content server 402 and network node 116 may stop sending the redundant versions for high quality content 406A for sub-area k 408A-C when P_UE(2,k)<P_Low. The following is one example pseudo code for performing the described operations:

```
For each sub area k
    If (P_UE(2,k) < P_Low)
        Stop sending the redundant versions for high quality packet for
    sub-area k
    Else if (P_UE(2,k) > P_High)
        Send the redundant versions for high quality packet for sub-
        area k if having available resources
    End if
End Loop k
If {(P_UE_SUM(2) < P_Low) and (no redundant versions sent from
any sub-area)}
```

```
    Increase both Content Bit and FEC coding rates for high quality
        packets
Else if (P_UE_SUM(2) > P_High)
        Decrease both Content Bit and FEC coding rates for high quality
packets
End If
```

At step 612, the transmission scheme may be adjusted for high quality content 406A based on Type 3 feedback. In certain embodiments, the Content Bit Rate, FEC coding rate, and/or MCS may be adjusted for high quality content 406A based on the Type 3 feedback received from wireless devices 110. In a particular embodiment, for example, content server 402 and network nodes 115 may increase the Content Bit Rate and/or adjust FEC coding rate and MCS, accordingly, for high quality content 406A when P_UE_SUM (3)>P_High and resources are available for doing so. As another example, content server 402 and network node 116 may decrease Content Bit Rate, FEC coding rate and/or MCS for high quality content 406A when P_UE_SUM (3)<P_Low. The following is one example pseudo code for performing the described operations:

```
If {(P_UE_SUM(3) > P_High) and (Have available resources for any
sub-area)}
        Increase Content Bit rate and adjust FEC coding rate and MCS
        accordingly for high quality packets
Else if (P_UE_SUM(3) < P_Low)
        Decrease Content Bit Rate and FEC coding rates for high quality
packets
End If
```

Figure 7:
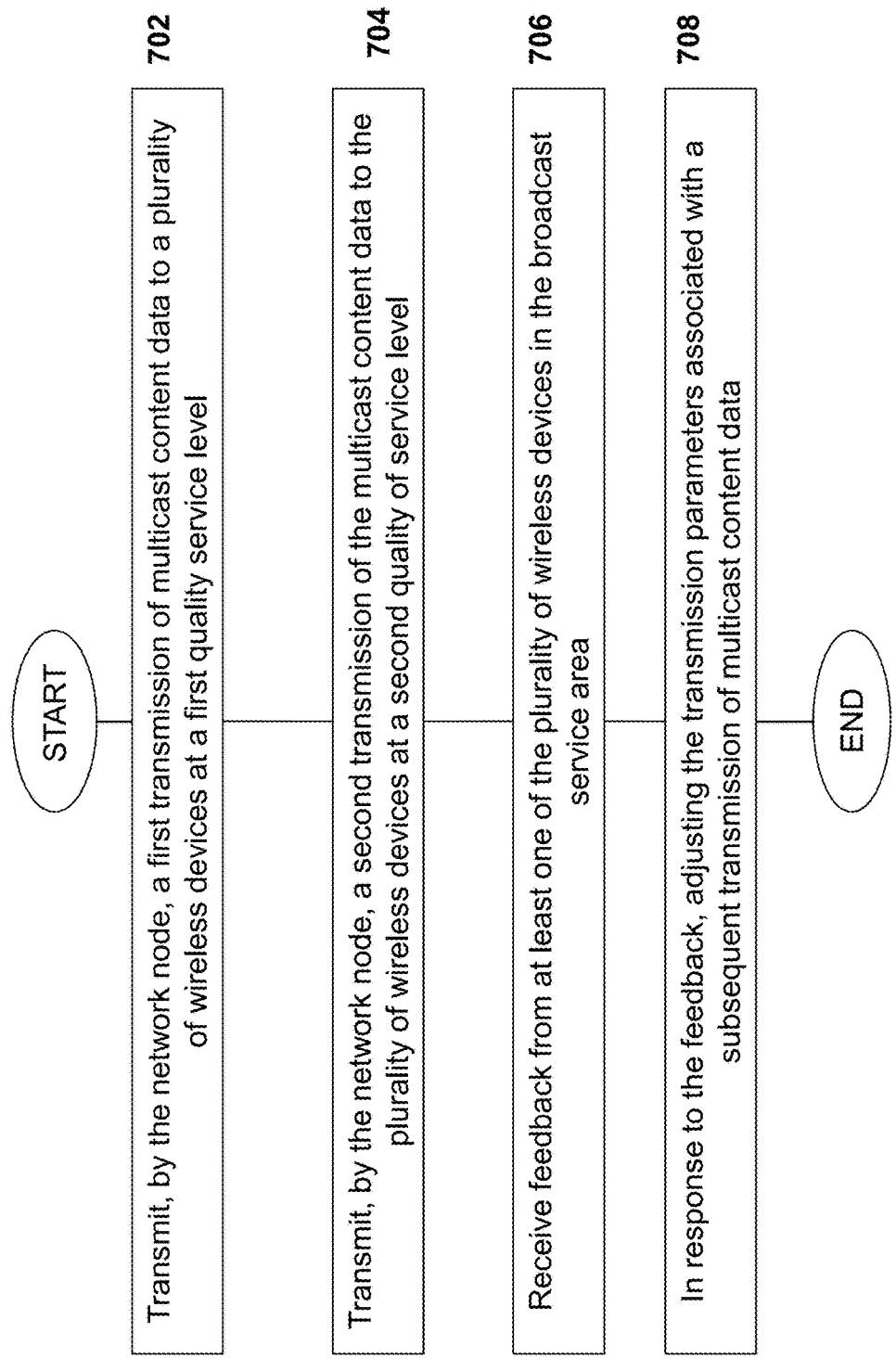
FIG. 7 depicts yet another method for adjusting a transmission scheme for providing MBMS data content, according to certain embodiments.

FIG. 7 depicts yet another method for adjusting a transmission scheme for providing MBMS data content, according to certain embodiments. The method may begin at step 702 with the transmission, by a network node 115, of a first transmission of multicast content data to wireless devices 110. In certain embodiments, the first transmission may be of a first quality service level. For example, the first transmission may include one or more packets of lower quality content 406B.

At step 704, the network node 116 transmits a second transmission of the multicast content data to wireless devices 110. In certain embodiments, the second transmission may be of a second quality service level. For example, the second transmission may include one or more packets of higher quality content 406A.

At step 706, feedback is collected from wireless devices 110. The feedback may be collected by network nodes 115 and forwarded to a content server 402, in certain embodiments. Content server 402 may collect all feedback from wireless devices in the service areas 408A-C. The feedback may include any of the types of feedback described above. For example, the feedback may include Type 1, Type 2, and/or Type 3 feedbacks as described above.

At 708, one or more transmission parameters associated with the transmission scheme may be adjusted based on the feedback received from wireless devices 110. The adjustment of the transmission scheme may include the adjustment of parameters for a subsequent transmission of low quality content 406B for Type 1 feedback, as was described above with regard to step 606 of FIG. 6. Additionally or alternatively, the adjustment may include the adjustment of transmission parameters for a subsequent transmission of high quality content 406A for Type 2 and/or Type 3 feedback, as was described above with regard to steps 610 and 612 of FIG. 6. In various embodiments, such adjustments may include adjusting one or more of the Content Bit Rate, FEC coding rate, and MCS for high quality content 406A and/or low quality content 406B.

Figure 8:
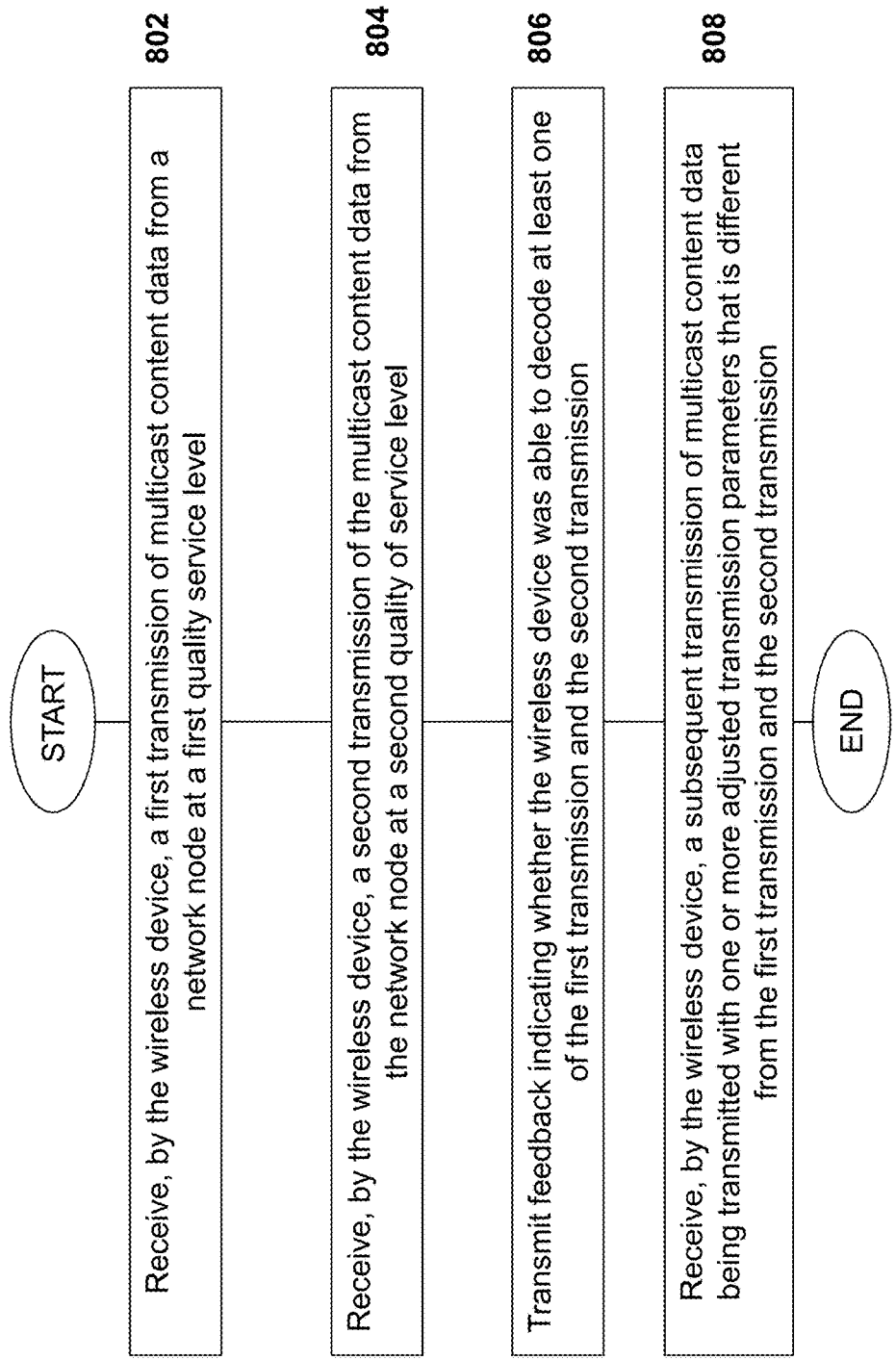
FIG. 8 depicts a method for receiving and decoding MBMS content that is transmitted using multiple transmission schemes, according to certain embodiments.

FIG. 8 depicts a method for receiving and decoding MBMS content that is transmitted using multiple transmission schemes, according to certain embodiments. The method may begin at step 802 when a wireless device 110A receives a first transmission of multicast content data from a network node 115. In certain embodiments, the first transmission may be of a first quality service level. For example, the first transmission may include one or more packets of lower quality content 406B.

At step 804, wireless device 110A receives a second transmission of the multicast content data from network node 115. In certain embodiments, the second transmission may be of a second quality service level. For example, the second transmission may include one or more packets of higher quality content 406A.

At step 806, feedback may be transmitted by wireless device 110A. The feedback may indicate, in certain embodiments, whether wireless device 110A was able to decode either or both of the first and second transmissions. In particular embodiments, the feedback may be transmitted to network node 115 and then forwarded to a content server 402. Content server 402 may collect all feedback from wireless devices in the service areas 408A-C.

At 808, a subsequent transmission of multicast content data may be received by wireless device 110A. The received transmission may be transmitted by network node 115 and received by wireless device 110A with an adjusted transmission scheme. As described above, such adjustments may include adjusting one or more of the Content Bit Rate, FEC coding rate, and MCS for high quality content 406A and/or low quality content 406B.

The above described methods may be used to adjust the transmission scheme of streamed content using a MBMS. However, it may be recognized that the methods may be modified as appropriate for use with providing downloaded content provided by MBMS. For example, the downloaded content may be delivered during off-peak hours, stored in mobile device memory, and accessed at a time of the user's choosing, in certain embodiments. As a result, content server 402 may be able to maximize efficiency when offering services such as podcasts, software upgrades, and advertisements to a large number of mobile devices and set-top boxes.

In a particular embodiment, each wireless device 110 may first attempt to decode MCCH at specific time. The MCCH may contain all the information required for decoding MTCH correctly. Besides the source and FEC coding rates, MCS, and the sequence number, the MCCH may also inform wireless devices 110 a transmission is a new transmission or a redundant version of a previous transmission. In certain embodiments, when the application data packet is correctly decoded by wireless device 110, no information may be sent to network node 115 though a NAK may be sent to network node 115 through PRACH or PUCCH.

As described above, the NAK feedbacks may be spread over a larger time period to avoid congestion where many wireless devices 110 are expected to be providing NAK feedback. Based on the feedback from wireless devices 110, redundant versions of content can be sent to the wireless devices having NAK feedbacks through their serving cells. This feedback information can also be used for adjusting the source bit rate and FEC coding rate at the application level for a new transmission. Redundant version may also be transmitted to a sub service area or to some specific wireless devices using the dedicated PDSCH where the number of wireless devices having NAK feedbacks is small.

Figure 9:
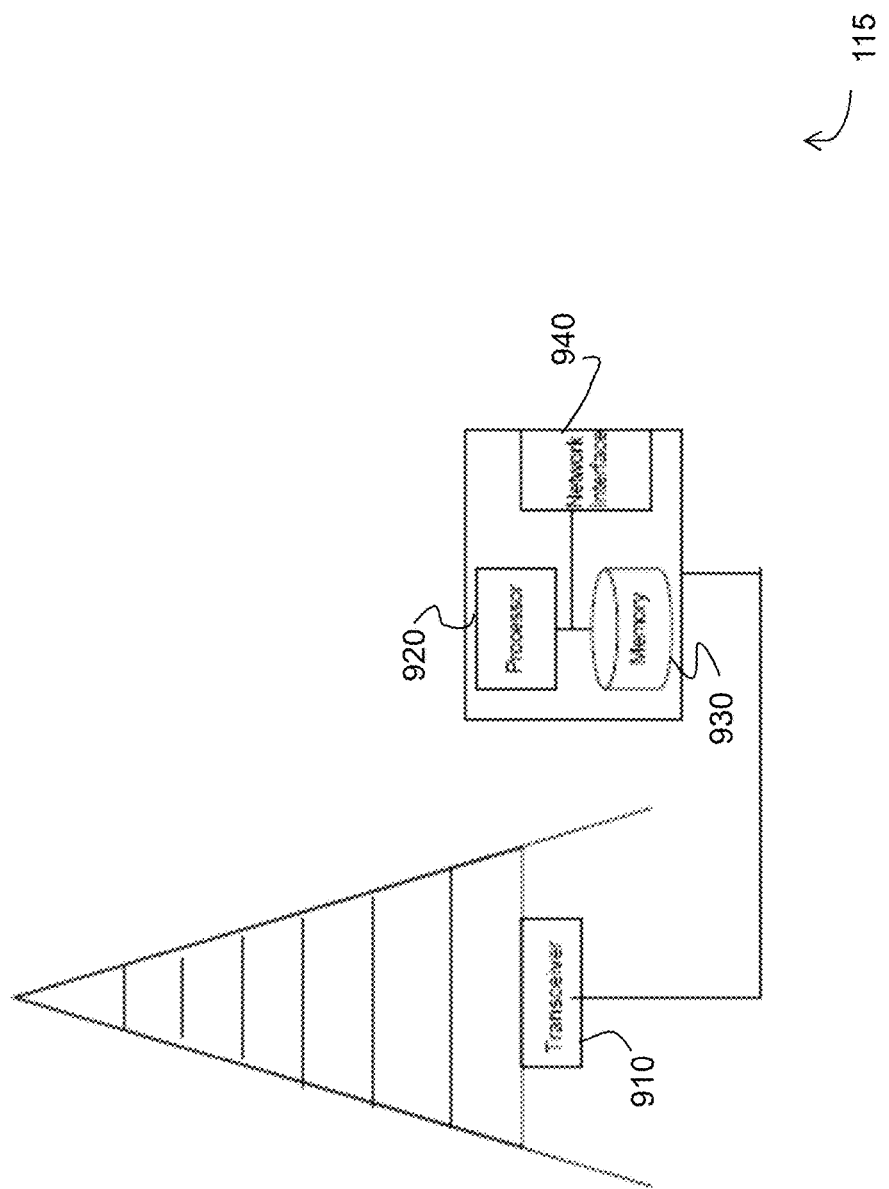
FIG. 9 is a block diagram illustrating certain embodiments of a radio network node, according to certain embodiments.

FIG. 9 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogeneous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 910, processor 920, memory 930, and network interface 940. In some embodiments, transceiver 910 facilitates transmitting wireless signals to and receiving wireless signals from wireless device 110 (e.g., via an antenna), processor 920 executes instructions to provide some or all of the functionality described above as being provided by a radio network node 115, memory 930 stores the instructions executed by processor 920, and network interface 940 communicates signals to backend network components, such as a gateway, switch, router, Internet, Public Switched Telephone Network (PSTN), core network nodes 130, radio network controllers 120, etc.

Processor 920 may include any suitable combination of hardware and software implemented in one or more modules to execute instructions and manipulate data to perform some or all of the described functions of radio network node 115. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for radio network node 115, send output from radio network node 115, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of radio network node 115 may include additional components beyond those shown in FIG. 9 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 10:
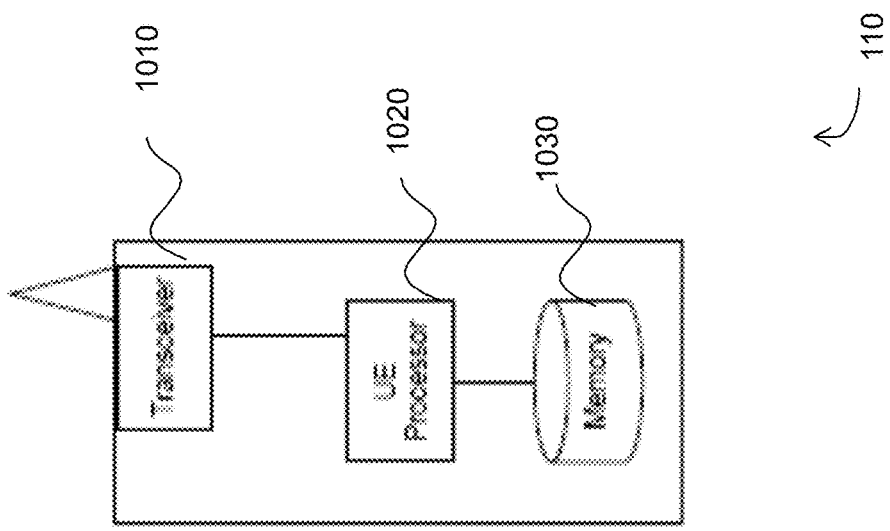
FIG. 10 is a block diagram illustrating certain embodiments of a wireless device, according to certain embodiments.

FIG. 10 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1010, processor 1020, and memory 1030. In some embodiments, transceiver 1010 facilitates transmitting wireless signals to and receiving wireless signals from radio network node 115 (e.g., via an antenna), processor 1020 executes instructions to provide some or all of the functionality described above as being provided by wireless device 110, and memory 1030 stores the instructions executed by processor 1020.

Processor 1020 may include any suitable combination of hardware and software implemented in one or more modules to execute instructions and manipulate data to perform some or all of the described functions of wireless device 110. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above).

FIG. 11 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to a suitable node, such as a gateway, switch, router, Internet, Public Switched Telephone Network (PSTN), radio network nodes 115, radio network controllers 120, core network nodes 130, etc.

Processor 1120 may include any suitable combination of hardware and software implemented in one or more modules to execute instructions and manipulate data to perform some or all of the described functions of the network node. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, a number of new approaches for adaptation of content bit rate and coding rate may be provided to improve MBMS service reliability and efficiency. Another advantage may be that differentiated quality of service (QoS) levels may be provided to users of wireless devices receiving MBMS services. Providing differentiated services may benefit content providers by providing increased revenues for premium users who are willing to pay more money to receive better service quality.

Still another advantage may be that source and FEC coding schemes and MCS that are applied initially may be adjusted for subsequent transmission on an application level. For example, transmission schemes that initially use minimum MCS may be adjusted to a higher MCS based on feedback received from wireless devices in the service area. Additionally or alternatively, the source coding and FEC coding rates may be adjusted to meet desired quality of service levels.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The invention claimed is:

1. A method for providing broadcast multicast service by a network node, comprising:
   transmitting, by the network node, a first transmission of multicast content data to a plurality of wireless devices in a broadcast service area at a first quality of service level, wherein the multicast content transmitted at the first quality of service level is encoded at a first resolution level;
   transmitting, by the network node, at substantially the same time as the first transmission of multicast content data, a second transmission of the multicast content data to the plurality of wireless devices at a second quality of service level, wherein the multicast content transmitted at the second quality of service level is encoded at a second resolution level that is different from the first resolution level;
   receiving at least two types of feedback from at least several of the plurality of wireless devices in the broadcast service area to which both the first transmission of multicast content data and the second transmission of the multicast content data were transmitted; and
   in response to an amount of each of the at least two types of feedback received from the at least several wireless devices, adjusting one or more transmission parameters associated with a subsequent transmission of multicast content data; wherein feedback is selected from a group consisting of:
   feedback that is user generated and indicates that a user of the wireless device is unsatisfied with content quality in response to the first transmission being received at an error rate that is below a low-quality target error rate and that the second transmission was received at an error rate that is above a high-quality target error rate; and
   feedback that is user generated and indicates that a user of the wireless device is unsatisfied with a quality level of the second transmission in response to the first transmission being received at a first error rate that is below a first target error rate and the second transmission being received at a second error rate that is below a second target error rate.

2. The method of claim 1, wherein the second transmission comprises supplemental information that was not provided in the first transmission, the supplemental information improving and enhancing multicast content quality.

3. The method of claim 1, wherein:
   feedback is received from at least several of the plurality of wireless devices in the broadcast service area; and adjusting the one or more transmission parameters associated with the subsequent transmission of multicast content data comprises:
  determining a type of feedback received from each of the plurality of wireless devices within a cell;
  calculating a percentage of the plurality of wireless devices that are sending each type of feedback; and
  adjusting the modulation and coding scheme for the subsequent transmission of multicast content data based on the percentage of the plurality of wireless devices that are sending each type of feedback.

4. The method of claim 3, wherein adjusting the modulation and coding scheme for the subsequent transmission is selected from the group consisting of:
  decreasing at least one of a content bit rate, a FEC coding rate and a MCS for the first transmission if the feedback indicates that the plurality of wireless devices are not able to decode the first transmission;
  increasing at least one of the content bit rate, the FEC coding rate, and the MCS for the first transmission if the feedback indicates that the plurality of wireless devices are able to decode the first transmission;
  increasing at least one of the content bit rate, the FEC coding rate, and the MCS if the feedback indicates that a threshold value of wireless devices are able to decode the second transmission but are not satisfied;
  transmitting a redundant version of the first transmission if the feedback indicates that the plurality of wireless devices are not able to decode the first transmission; and
  transmitting a redundant version of the second transmission if the feedback indicates that the plurality of wireless devices are not able to decode the second transmission.

5. The method of claim 3, wherein:
  the feedback indicates that at least one wireless device of the plurality of wireless devices is not able to decode the first transmission; and
  adjusting the modulation and coding scheme for the subsequent transmission comprises transmitting a redundant version of the first transmission to a sub-area where the at least one wireless device of the plurality of wireless devices is not able to decode the first transmission.

6. The method of claim 3, wherein:
the feedback indicates that at least one wireless device of the plurality of wireless devices is not able to decode the second transmission; and
  adjusting the modulation and coding scheme for the subsequent transmission comprises transmitting a redundant version of the second transmission to a sub-area where the at least one wireless device of the plurality of wireless devices is not able to decode the second transmission.

7. A method for receiving broadcast multicast service by a wireless device, comprising:
  receiving, by the wireless device, a first transmission of multicast content data from a network node at a first quality of service level, wherein the multicast content received at the first quality of service level is encoded at a first resolution level;
  receiving, by the wireless device, at substantially the same time as the first transmission of multicast content data, a second transmission of the multicast content data from the network node at a second quality of service level, wherein the multicast content received at the second quality of service level is encoded at a second resolution level that is different from the first resolution level;
  transmitting, by the wireless device, one of at least two types of feedback indicating whether the wireless device was able to decode at least one of the first transmission and the second transmission; and
  receiving, by the wireless device, a subsequent transmission of multicast content data from the network node, the subsequent transmission of multicast content data being transmitted with one or more adjusted transmission parameters that is different from the first transmission and the second transmission, wherein the one or more adjusted transmission parameters are adjusted in response to an amount of each of the at least two types of feedback transmitted by the wireless device and by other wireless devices; wherein feedback is selected from a group consisting of:
  feedback that is user generated and indicates that a user of the wireless device is unsatisfied with content quality in response to the first transmission being received at an error rate that is below a low-quality target error rate and that the second transmission was received at an error rate that is above a high-quality target error rate; and
  feedback that is user generated and indicates that a user of the wireless device is unsatisfied with a quality level of the second transmission in response to the first transmission being received at a first error rate that is below a first target error rate and the second transmission being received at a second error rate that is below a second target error rate.

8. The method of claim 7, wherein the second transmission comprises supplemental information that was not provided in the first transmission, the supplemental information improving and enhancing multicast content quality.

9. The method of claim 7, wherein with the one or more adjusted transmission parameters associated with the subsequent transmission of the multicast content data is selected from the group consisting of:
  an increased or decreased content bit rate;
  an increased or decreased FEC coding rate; and
  an increased or decreased MCS.

10. A network node for providing broadcast multicast service, the network node comprising:
  memory containing executable instructions; and
  one or more processors in communication with the memory, the one or more processors operable to execute the instructions to cause the network node to:
    transmit a first transmission of multicast content data to a plurality of wireless devices in a broadcast service area at a first quality of service level, wherein the multicast content transmitted at the first quality of service level is encoded at a first resolution level;
    transmit, at substantially the same time as the first transmission of multicast content data, a second transmission of the multicast content data to the plurality of wireless devices at a second quality of service level, wherein the multicast content transmitted at the second quality of service level is encoded at a second resolution level that is different from the first resolution level;
    receive at least two types of feedback from at least several of the plurality of wireless devices in the broadcast service area to which both the first transmission of multicast content data and the second transmission of the multicast content data were transmitted; and in response to an amount of each of the at least two types of feedback received from the at least several wireless devices, adjust one or more transmission parameters associated with a subsequent transmission of multicast content data; wherein feedback is selected from a group consisting of:

feedback that is user generated and indicates that a user of the wireless device is unsatisfied with content quality in response to the first transmission being received at an error rate that is below a low-quality target error rate and that the second transmission was received at an error rate that is above a high-quality target error rate; and feedback that is user generated and indicates that a user of the wireless device is unsatisfied with a quality level of the second transmission in response to the first transmission being received at a first error rate that is below a first target error rate and the second transmission being received at a second error rate that is below a second target error rate.

11. The network node of claim 10, wherein the second transmission comprises supplemental information that was not provided in the first transmission, the supplemental information improving and enhancing multicast content quality.

12. The network node of claim 10, wherein:
feedback is received from at least several of the plurality of wireless devices in the broadcast service area; and
adjusting the one or more transmission parameters associated with the subsequent transmission of multicast content data comprises:
determining a type of feedback received from each of the plurality of wireless devices within a cell;
calculating a percentage of the plurality of wireless devices that are sending each type of feedback; and
adjusting the modulation and coding scheme for the subsequent transmission of multicast content data based on the percentage of the plurality of wireless devices that are sending each type of feedback.

13. The network node of claim 12, wherein adjusting the modulation and coding scheme for the subsequent transmission is selected from the group consisting of:
decreasing at least one of a content bit rate, a FEC coding rate and a MCS for the first transmission if the feedback indicates that the plurality of wireless devices are not able to decode the first transmission;
increasing at least one of the content bit rate, the FEC coding rate, and the MCS for the first transmission if the feedback indicates that the plurality of wireless devices are able to decode the first transmission;
increasing at least one of the content bit rate, the FEC coding rate, and the MCS if the feedback indicates that a threshold value of wireless devices are able to decode the second transmission but are not satisfied;
transmitting a redundant version of the first transmission if the feedback indicates that the plurality of wireless devices are not able to decode the first transmission; and
transmitting a redundant version of the second transmission if the feedback indicates that the plurality of wireless devices are not able to decode the second transmission.

14. The network node of claim 13, wherein: the feedback indicates that at least one wireless device of the plurality of wireless devices is not able to decode the first transmission; and
adjusting the modulation and coding scheme for the subsequent transmission comprises transmitting a redundant version of the first transmission to a sub-area where the at least one wireless device of the plurality of wireless devices is not able to decode the first transmission.

15. The network node of claim 13, wherein:
the feedback indicates that at least one wireless device of the plurality of wireless devices is not able to decode the second transmission; and
adjusting the modulation and coding scheme for the subsequent transmission comprises transmitting a redundant version of the second transmission to a sub-area where the at least one wireless device of the plurality of wireless devices is not able to decode the second transmission.

16. A wireless device for receiving broadcast multicast service by a wireless device, the wireless device comprising:
memory containing executable instructions; and
one or more processors in communication with the memory, the one or more processors operable to execute the instructions to cause the wireless device to:
receive a first transmission of multicast content data from a network node at a first quality of service level, wherein the multicast content received at the first quality of service level is encoded at a first resolution level;
receive, at substantially the same time as the first transmission of multicast content data, a second transmission of the multicast content data from the network node at a second quality of service level, wherein the multicast content received at the second quality of service level is encoded at a second resolution level that is different from the first resolution level;
transmit one of at least two types of feedback indicating whether the wireless device was able to decode at least one of the first transmission and the second transmission; and
receive a subsequent transmission of multicast content data from the network node, the subsequent transmission of multicast content data being transmitted with one or more adjusted transmission parameters that is different from the first transmission and the second transmission, wherein the one or more adjusted transmission parameters are adjusted in response to an amount of each of the at least two types of feedback transmitted by the wireless device and by other wireless devices; wherein the feedback is selected from the group consisting of:
feedback that is user generated and indicates that a user of the wireless device is unsatisfied with content quality in response to the first transmission being received at an error rate that is below a low-quality target error rate and that the second transmission was received at an error rate that is above a high-quality target error rate; and
feedback that is user generated and indicates that a user of the wireless device is unsatisfied with a quality level of the second transmission in response to the first transmission being received at a first error rate that is below a first target error rate and the second transmission being received at a second error rate that is below a second target error rate.

17. The wireless device of claim 16, wherein the second transmission comprises supplemental information that was not provided in the first transmission, the supplemental information improving and enhancing multicast content quality.

18. The wireless device of claim 16, wherein with the one or more adjusted transmission parameters associated with the subsequent transmission of the multicast content data is selected from the group consisting of:
   an increased or decreased content bit rate;
   an increased or decreased FEC coding rate; and
   an increased or decreased MCS.

19. The wireless device of claim 16, wherein the subsequent transmission of the multicast content data comprises a redundant version of at least one of the first transmission and the second transmission.

* * * * *